(12) United States Patent
Lu et al.

(10) Patent No.: US 8,749,721 B2
(45) Date of Patent: Jun. 10, 2014

(54) TOUCHING DISPLAY PANEL AND DISPLAY DEVICE USING THE SAME

(75) Inventors: Chao-Liang Lu, Miao-Li County (TW); Hsin-Li Chen, Miao-Li County (TW); Jian-Jhong Fu, Miao-Li County (TW); Hao-Ching Chien, Miao-Li County (TW); Tsau-Hua Hsieh, Miao-Li County (TW); Hung-Yu Chen, Miao-Li County (TW); Chiu-Lien Yang, Miao-Li County (TW); Jia-Pang Pang, Miao-Li County (TW)

(73) Assignees: Innocom Technology (Shenzhen) Co., Ltd., Shenzhen (CN); Chimei Innolux Corporation, Miao-Li County (TW)

( * ) Notice: Subject to any disclaimer, the term of this patent is extended or adjusted under 35 U.S.C. 154(b) by 3 days.

(21) Appl. No.: 13/536,209

(22) Filed: Jun. 28, 2012

(65) Prior Publication Data

US 2013/0002997 A1    Jan. 3, 2013

(30) Foreign Application Priority Data

Jun. 28, 2011    (TW) .............................. 100122641 A

(51) Int. Cl.
 *G02F 1/1335* (2006.01)
(52) U.S. Cl.
 USPC ............................................................ 349/8

(58) Field of Classification Search
 USPC ............................................................ 349/8
 See application file for complete search history.

(56) References Cited

U.S. PATENT DOCUMENTS

| | | | | |
|---|---|---|---|---|
| 2008/0062148 A1* | 3/2008 | Hotelling et al. | ............. | 345/174 |
| 2010/0087307 A1* | 4/2010 | Murata et al. | ................... | 501/67 |

FOREIGN PATENT DOCUMENTS

TW    M350725    2/2009

OTHER PUBLICATIONS

Office action dated Mar. 11, 2014 from corresponding application No. TW 100122641.

\* cited by examiner

*Primary Examiner* — Phu Vu
(74) *Attorney, Agent, or Firm* — Lowe Hauptman & Ham, LLP

(57) ABSTRACT

A touching display panel and a display device using the same are provided. The touching display panel includes a liquid crystal layer, a first substrate having a hard surface structure, a second substrate, a touch sensor layer, a thin-film transistor layer, and a color filter layer. The first and second substrates are respectively disposed at two sides of the liquid crystal layer. The touch sensor layer is disposed between the first substrate and the liquid crystal layer, and is formed on the first substrate. The thin-film transistor layer and the color filter layer are both disposed between the first substrate and the second substrate. At least one of the thin-film transistor layer and the color filter layer is formed on the first substrate.

14 Claims, 3 Drawing Sheets

TOUCHING DISPLAY PANEL AND DISPLAY DEVICE USING THE SAME

This application claims the benefit of Taiwan application Serial No. 100122641, filed Jun. 28, 2011, the subject matter of which is incorporated herein by reference.

BACKGROUND OF THE INVENTION

1. Field of the Invention

The disclosure relates in general to a display panel and a display device using the same, and more particularly to a touching display panel and a display device using the same.

2. Description of the Related Art

Accompanied with great advancement of the touch sensing technique, a user is able to carry out various operations by manipulating a touch panel. When a touch panel is equipped a display panel, a user may even carry out various operations by directly manipulating images presented on the display panel.

Both the touch panel and the display panel comprise a glass substrate. When the touch panel is equipped on the display panel, a total thickness accumulated by all the glass substrates is quite formidable.

Further, both the touch panel and the display panel need a control circuit board for operation control. When the touch panel is equipped on the display panel, an appropriate arrangement for the control circuit boards may be extremely complicated. Therefore, there is a need for a solution for ideally combining the touch panel and the display panel to overcome current technical drawbacks.

SUMMARY OF THE INVENTION

The disclosure is directed to a touching display panel, which structurally integrates a touch sensor layer, a thin-film transistor layer or a color filter layer to a substrate having a hard surface structure, so as to significantly decrease the number of substrates and thus reduce a thickness of the touching display panel to resultantly offer an integrated touching display panel that allows optimal circuit planning and design.

According to an embodiment of the present disclosure, a touching display panel is provided. The touching display panel comprises a liquid crystal layer, a first substrate having a hard surface structure, a second substrate, a touch sensor layer, a thin-film transistor layer and a color filter layer. The first and second substrates are respectively disposed at two sides of the liquid crystal layer. The touch sensor layer is disposed between the first substrate and the liquid crystal layer, and is formed on the first substrate. The thin-film transistor layer and the color filter layer are disposed between the first and second substrates. At least one of the thin-film transistor layer and the color filter layer is formed on the first substrate.

According to another embodiment of the present disclosure, a display device is provided. The display device comprises a touching display panel and a backlight module. The touching display panel comprises a liquid crystal layer, a first substrate having a hard surface structure, a second substrate, a touch sensor layer, a thin-film transistor layer and a color filter layer. The first and second substrates are respectively disposed at two sides of the liquid crystal layer. The touch sensor layer is disposed between the first substrate and the liquid crystal layer, and is formed on the first substrate. The thin-film transistor layer and the color filter layer are disposed between the first and second substrates. At least one of the thin-film transistor layer and the color filter layer is formed on the first substrate. The backlight module is for providing a backlight to the touching display panel.

The above and other aspects of the disclosure will become better understood with regard to the following detailed description of the preferred but non-limiting embodiments. The following description is made with reference to the accompanying drawings.

DETAILED DESCRIPTION OF THE INVENTION

Various embodiments shall be given below for describing a touching display panel of the present disclosure, which structurally integrates a touch sensor layer, a thin-film transistor layer or a color filter layer to a substrate with a hard surface structure, so as to significantly decrease the number of substrates and thus reduce a thickness of the touching display panel to resultantly offer an integrated touching display panel that allows optimal circuit planning and design. Further, glass substrates are taken as examples for the substrates according to the embodiments of the present disclosure rather than limiting the present disclosure thereto. It should also be noted that the present disclosure is to be described by way of example and in terms of the embodiments below, and it is also to be understood that the disclosure is not limited thereto. Further, to clearly emphasize on technical characteristics of the present disclosure, certain components may not be depicted in the diagrams.

First Embodiment

Figure 1:
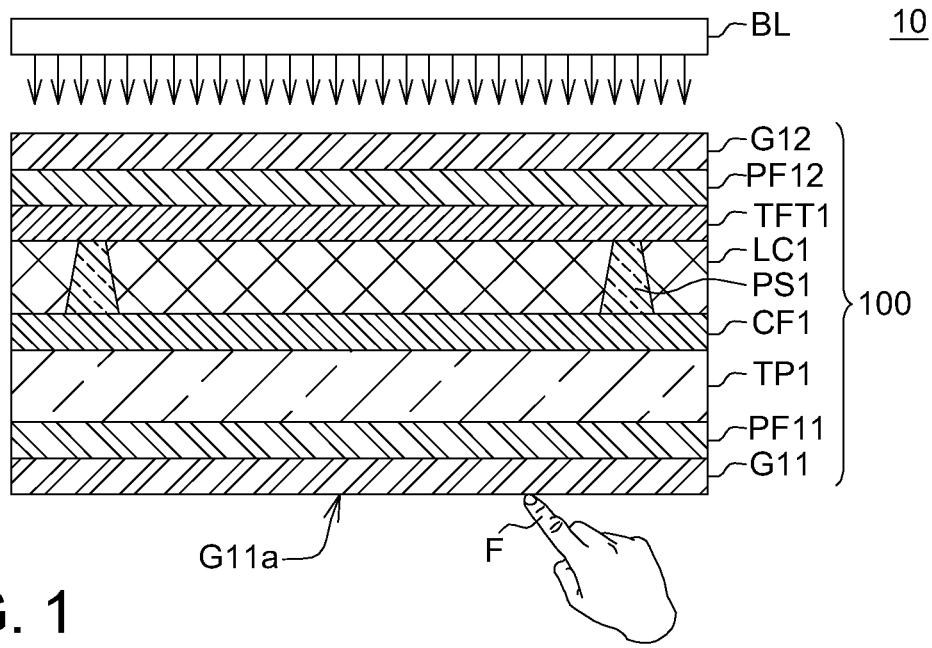
FIG. 1 is a schematic diagram of a display device according to a first embodiment.

Referring to FIG. 1 showing a schematic diagram of a display device 10 according to a first embodiment, the display device 10 comprises a touching display panel 100 and a backlight module BL providing a light source to the touching display panel 100. The touching display panel 100 comprises a liquid crystal layer LC1, a first glass substrate G11, a second glass substrate G12, a touch sensor layer TP1, a thin-film transistor layer TFT1 and a color filter layer CF1. In this embodiment, the first glass substrate G11 serves as an outmost-layer cover glass, which comes into contact with a user finger F and protects internal components of the display panel 100 from moisture, abrasions and impacts. The second glass substrate G12 is a glass substrate disposed at a front side of the backlight module BL. The first glass G11 comprises a hard surface structure G11a processed by chemically enhanced treatments or physically enhanced treatments. In the chemically enhanced treatments, the first glass substrate G11 is reacted with a solution containing potassium (K) ions to form the hard surface structure G11a comprising potassium ions at a surface. Contributed by a larger volume of the potassium ions, a tight binding force is generated to increase a hardness of the glass. In the physically enhanced treatments, the first glasses substrate G11 is grinded to remove defects at a surface thereof to further prevent probabilities of glass breakage. That is, the first glass substrate G11 is not a conventional glass substrate used for manufacturing a thin-film transistor structure, a conventional glass substrate used for manufacturing a color filter structure, or a conventional glass substrate used for manufacturing a touch sensing structure. Therefore, the number of the glass substrates may be significantly decrease by 2 pieces to reduce a thickness of the display panel 100.

In this embodiment, through integration, the thin-film transistor layer TFT1 and the color filter layer CF1 are respectively disposed at two sides of the liquid crystal layer LC1; the touch sensor layer TP1 and the color filter layer CF1 are joined with the first glass substrate G11. Thus, conventional glass substrates used for respectively manufacturing a source sensor structure and a color filter structure are not required.

As shown in FIG. 1, the first glass substrate G11 and the second glass substrate G12 are respectively disposed at the two sides of the liquid crystal layer LC1. From outside to inside, the first glass substrate G11, the touch sensor layer TP1, the color filter layer CF1, the liquid crystal layer LC1, the thin-film transistor layer TFT1 and the second glass substrate G12 are sequentially arranged. More specifically, the touch sensor layer TP1 and the color filter layer CF1 are both formed on the first glass substrate G11, the thin-film transistor layer TFT1 is formed on the second glass substrate G12, and the touch sensor layer TP1 is disposed between the first glass substrate G11 and the color filter layer CF1. Further, other materials may be arranged between the layers as required.

For example, the touching display panel 100 further comprises a first polarization layer PF11 and a second polarization layer PF12. The first polarization layer PF11 and second polarization layer PF12 may be joined with an internal structure of the touching display panel 100 through a polarizer-film-in-cell technique without any pasting process. For example, the first polarization layer PF11 and the second polarization layer PF12 are respectively disposed at the two sides of the liquid crystal layer LC1. The first polarization layer PF11 may be disposed between the first glass substrate G11 and the touch sensor layer TP1, or between the touch sensor layer TP1 and the color filter layer CF1. The second polarization layer PF12 may be disposed between the thin-film transistor layer TFT1 and the second glass substrate G12, or at an outer side of the second glass substrate G12 relative to the liquid crystal layer LC1. In the embodiment in FIG. 1, the first polarization layer PF11 is disposed between the first glass substrate G11 and the touch sensor layer TP1, and the second polarization layer PF12 is disposed between the thin-film transistor layer TFT1 and the second glass substrate G12.

For example, the touching display panel 100 further comprises a first polarization layer PF11 and a second polarization layer PF12. The first polarization layer PF11 and second polarization layer PF12 may be joined with an internal structure of the touching display panel 100 through a polarizer-film-in-cell technique without any pasting process. For example, the first polarization layer PF11 and the second polarization layer PF12 are respectively disposed at the two sides of the liquid crystal layer LC1. The first polarization layer PF11 may be disposed between the first glass substrate G11 and the touch sensor layer TP1, or between the touch sensor layer TP1 and the color filter layer CF1. The second polarization layer PF12 may be disposed between the thin-film transistor layer TFT1 and the second glass substrate G12, or at an outer side of the second glass substrate G12 relative to the liquid crystal layer LC1. In the embodiment in FIG. 1, the first polarization layer PF11 is disposed between the first glass substrate G11 and the touch sensor layer TP1, and the second polarization layer PF12 is disposed between the thin-film transistor layer TFT1 and the second glass substrate G12.

Further, a black matrix of the color filter layer CF1 may be integrated to spacing elements PS1 through a black matrix sharing technique to further reduce a thickness of the color filter layer CF1.

Second Embodiment

Figure 2:
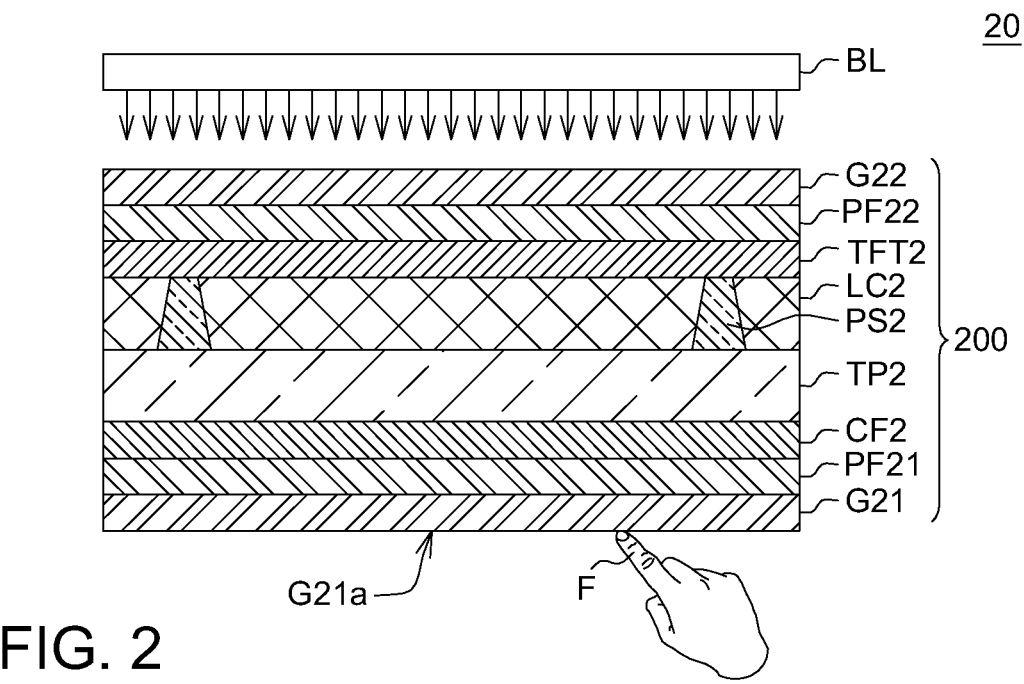
FIG. 2 is a schematic diagram of a display device according to a second embodiment.

FIG. 2 shows a schematic diagram of a display device 20 according to a second embodiment. A difference between a touching display panel 200 of the display device 20 in the second embodiment and the touching display panel 100 in the first embodiment is positions of a touch sensor layer TP2 and a color filter layer CF2. More specifically, the color filter layer CF2 of the touching display panel 200 is disposed between a first glass substrate G21 and the touch sensor layer TP2. Details of other correspondingly components are as those previously described and shall not be further given.

In this embodiment, the thin-film transistor layer TFT2 and the color filter layer CF2 are respectively disposed at two sides of a liquid crystal layer LC2. The touch sensor layer TP2 and the glass filter layer CF2 are joined with a first glass substrate G21 having a hard surface structure G21*a* through integration, such that a conventional glass substrate used for manufacturing a touch sensor layer structure and a conventional glass substrate used for manufacturing a color filter structure are not needed. Therefore, the number of the glass substrates may be significantly decrease by 2 pieces to reduce a thickness of the display panel 200.

As shown in FIG. 2, from outside to inside, the first glass substrate G21, the color filter layer CF2, the touch sensor layer TP2, the liquid crystal layer LC2, the thin-film transistor layer TFT2 and the second glass substrate G22 are sequentially arranged. Other materials may be arranged between the first glass substrate G21, the color filter layer CF2, the touch sensor layer TP2, the liquid crystal layer LC2, the thin-film transistor layer TFT2 and the second glass substrate G22 as required.

For example, a first polarization layer PF21 and a second polarization layer PF22 may be joined with an internal structure of the touching display panel 200 through a polarizer-film-in-cell technique without any pasting process. For example, the first polarization layer PF21 and the second polarization layer PF22 are respectively disposed at the two sides of the liquid crystal layer LC2. The first polarization layer PF21 may be disposed between the first glass substrate G21 and the color filter layer CF2, or between the color filter layer CF2 and the touch sensor layer TP2. The second polarization layer PF22 may be disposed between the thin-film transistor layer TFT2 and the second glass substrate G22, or at an outer side of the second glass substrate G22 relative to the liquid crystal layer LC2. In the embodiment in FIG. 2, the first polarization layer PF21 is disposed between the first glass substrate G21 and the color filter CF2, and the second polarization layer PF22 is disposed between the thin-film transistor layer TFT2 and the second glass substrate G22.

Further, a black matrix of the color filter layer CF2 may be integrated to spacing elements PS2 through a black matrix sharing technique to further reduce a thickness of the color filter layer CF2.

Third Embodiment

Figure 3:
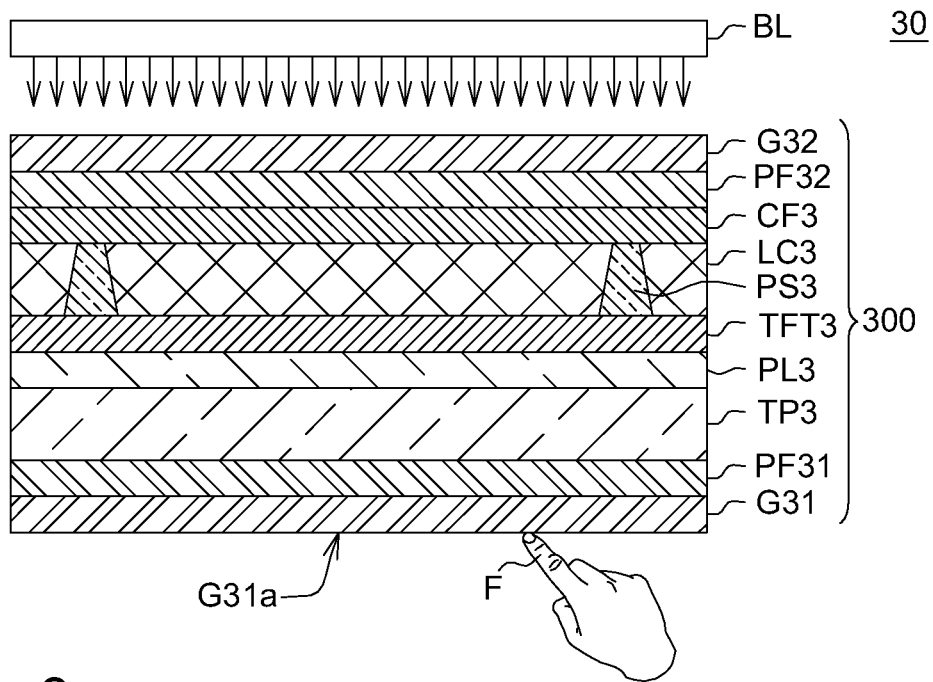
FIG. 3 is a schematic diagram of a display device according to a third embodiment.

FIG. 3 shows a schematic diagram of a display device 30 according to a third embodiment of the present disclosure. A difference between a touching display panel 300 of the display device 30 in the third embodiment and the touching display panel 100 in the first embodiment is positions of a thin-film transistor layer TFT3 and a color filter layer CF3. More specifically, the thin-film transistor layer TFT3 is formed on a first glass substrate G31, the color filter layer CF3 is formed on a second glass substrate G32, and a touch sensor layer TP3 is disposed between the first glass substrate G31 and the thin-film transistor layer TFT3. Details of other correspondingly components are as those previously described and shall not be further given.

Referring to FIG. 3, in the display panel 300 according to this embodiment of the present disclosure, through integration, the thin-film transistor layer TFT3 and the color filter layer CF3 are respectively disposed at two sides of a liquid crystal layer LC3; the touch sensor layer TP3 and the thin-film transistor layer TFT3 are both joined with a first glass substrate G31 having a hard surface structure G31a, and the color filter layer CF3 is joined with the second glass substrate G32. Therefore, a conventional glass substrate used for manufacturing a touch sensor layer structure and a conventional glass substrate used for manufacturing a thin-film transistor structure are not needed. Accordingly, the number of the glass substrates may be significantly decrease by 2 pieces to reduce a thickness of the display panel 300.

Further, when the touch sensor layer TP3 and the thin-film transistor layer TFT3 are integrated to a same side of the liquid crystal layer LC3, circuits of the touch sensor layer TP3 and the thin-film transistor layer TFT3 are given with more optimal planning and integration, so that a circuit layout design may be completed through an external circuit board disposed at one side of the touching display panel 300.

In this embodiment, the touching display panel 300 further comprises an insulation layer PL3. The insulation layer PL3 is disposed between the touch sensor layer TP3 and the thin-film transistor layer TFT3, so as to prevent undesired parasitic capacitance between the touch sensor layer TP3 and the thin-film transistor layer TFT3 that may undesirably affect image display effects or touch sensing effects.

Referring to FIG. 3, from outside to inside, the first glass substrate G31, the touch sensor layer TP3, the insulation layer PL3, the thin-film transistor layer TFT3, the liquid crystal layer LC3, the color filter layer CF3 and the second glass substrate G32 are sequentially arranged. Other materials may be arranged between the first glass substrate G31, the touch sensor layer TP3, the insulation layer PL3, the thin-film transistor layer TFT3, the liquid crystal layer LC3, the color filter layer CF3 and the second glass substrate G32 as required.

For example, a first polarization layer PF31 and a second polarization layer PF32 may be joined with an internal structure of the touching display panel 300 through a polarizer-film-in-cell technique with any pasting process. For example, the first polarization layer PF31 and the second polarization layer PF32 are respectively disposed at the two sides of the liquid crystal layer LC3. The first polarization layer PF31 may be disposed between the first glass substrate G31 and the touch sensor layer TP3, or between the touch sensor layer TP3 and the thin-film transistor layer TFT3. That is, the first polarization layer PF31 may be disposed between the touch sensor layer TP3 and the insulation layer PL3, or between the insulation layer PL3 and the thin-film transistor layer TFT3. The second polarization layer PF32 may be disposed between the color filter layer CF3 and the second glass substrate G32, or at an outer side of the second glass substrate G32 relative to the liquid crystal layer LC3. In the embodiment in FIG. 3, the first polarization layer PF31 is disposed between the first glass substrate G31 and the touch sensor layer TP3, and the second polarization layer PF32 is disposed between the color filter layer CF3 and the second glass substrate G32.

Further, a black matrix of the color filter layer CF3 may be integrated to spacing elements PS3 through a black matrix sharing technique to further reduce a thickness of the color filter layer CF3.

Fourth Embodiment

Figure 4:
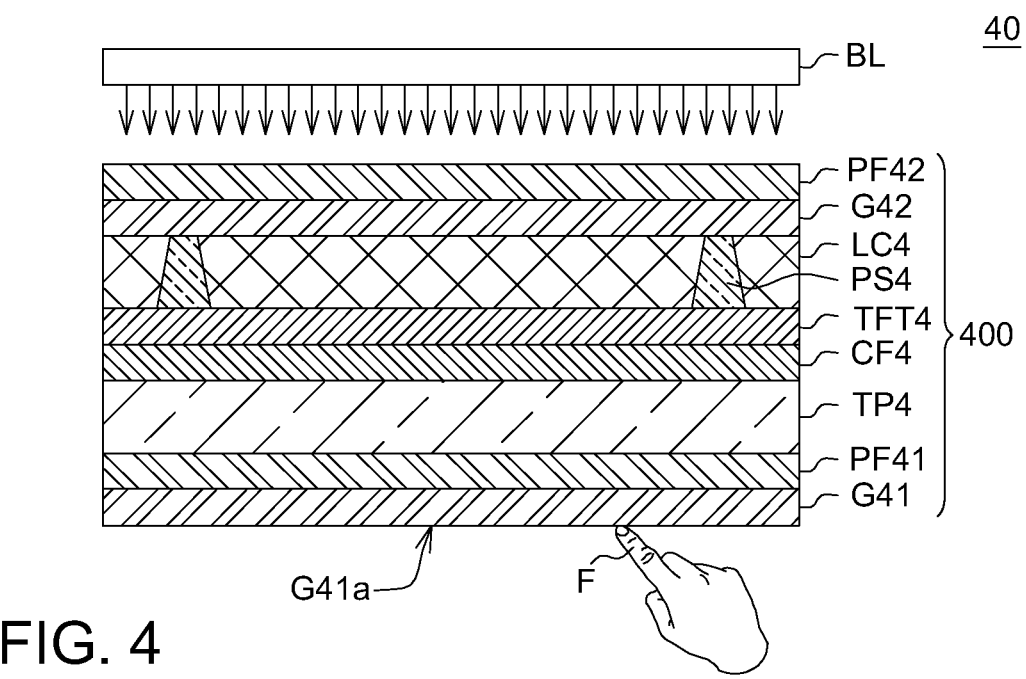
FIG. 4 is a schematic diagram of a display device according to a fourth embodiment.

FIG. 4 shows a schematic diagram of a display device 40 according to a fourth embodiment of the present disclosure. A difference between a touching display panel 400 of the display device 40 in the fourth embodiment and the touching display panel 100 in the first embodiment is a position of a thin-film transistor layer TFT4. More specifically, the thin-film transistor layer TFT4 and the color filter layer CF4 are both disposed between a first glass substrate G41 and a liquid crystal layer LC4, and the color filter layer CF4 is disposed between a touch sensor layer TP4 and the thin-film transistor layer TFT4. Details of other correspondingly components are as those previously described and shall not be further given.

Referring to FIG. 4, in the display panel 400 according to this embodiment of the present disclosure, through integration, the thin-film transistor layer TFT4 and the color filter layer CF4 are disposed at a same side of a liquid crystal layer LC4; the touch sensor layer TP4, the glass filter layer CF4 and a thin-film transistor layer TFT4 are all joined with a first glass substrate G41 having a hard surface structure G41a. Therefore, a conventional glass substrate used for manufacturing a touch sensor layer structure, a conventional glass substrate used for manufacturing a color filter structure, and a conventional glass substrate used for manufacturing a thin-film transistor structure are not needed.

Further, when the touch sensor layer TP4 and the thin-film transistor layer TFT4 are integrated to a same side of the liquid crystal layer LC4, circuits of the touch sensor layer TP4 and the thin-film transistor layer TFT4 are given with more optimal planning and integration, so that a circuit layout design may be completed through an external circuit board disposed at one side of the touching display panel 400.

Referring to FIG. 4, from outside to inside, the first glass substrate G41, the touch sensor layer TP4, the color filter layer CF4, the thin-film transistor layer TFT4, the liquid crystal layer LC4 and the second glass substrate G42 are sequentially arranged. Other materials may be arranged between the first glass substrate G41, the touch sensor layer TP4, the color filter layer CF4, the thin-film transistor layer TFT4, the liquid crystal layer LC4 and the second glass substrate G42 arranged in sequence as required.

For example, a first polarization layer PF41 and a second polarization layer PF42 are joined with an internal structure of the touching display panel 400 through a polarizer-film-in-cell technique without any pasting process. For example, the first polarization layer PF41 and the second polarization layer PF42 are respectively disposed at the two sides of the liquid crystal layer LC4. The first polarization layer PF41 may be disposed between the first glass substrate G41 and the touch sensor layer TP4, between the touch sensor layer TP4 and the color filter layer CF4, or between the color filter layer CF4 and the thin-film transistor layer TFT4. The second polarization layer PF42 may be disposed at an outer side of the second glass substrate G42 relative to the liquid crystal layer LC4. In the embodiment in FIG. 4, the first polarization layer PF41 is disposed between the first glass substrate G41 and the touch sensor layer TP4, and the second polarization layer PF42 is disposed at an outer side of the second glass substrate G42.

Further, a black matrix of the color filter layer CF4 may be integrated to spacing elements PS4 through a black matrix sharing technique to further reduce a thickness of the color filter layer CF4.

Fifth Embodiment

Figure 5:
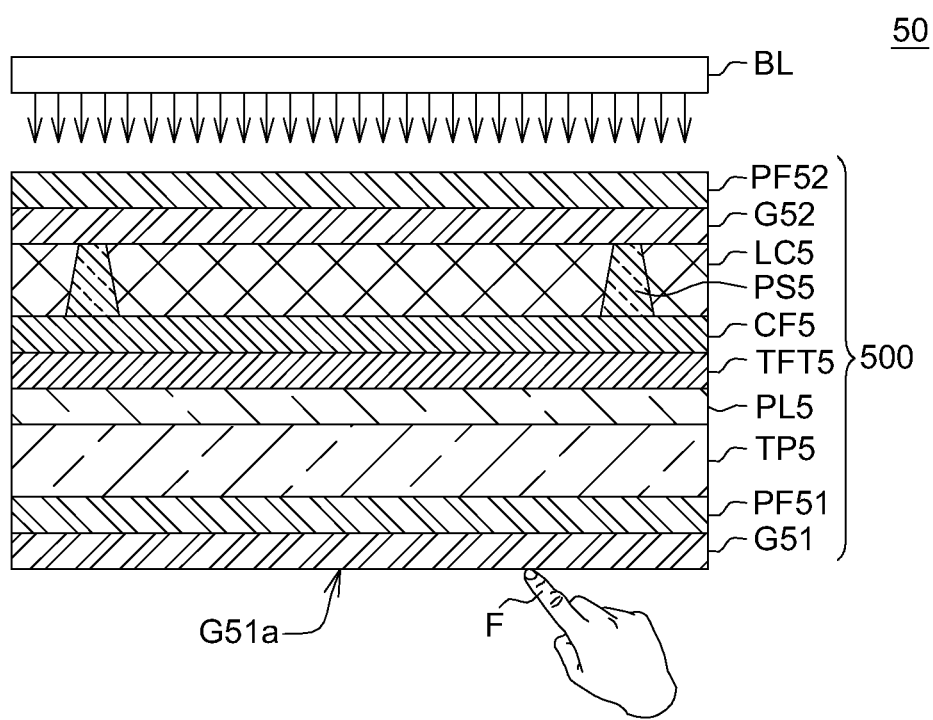
FIG. 5 is a schematic diagram of a display device according to a fifth embodiment.

FIG. 5 shows a schematic diagram of a display device 50 according to a fifth embodiment of the present disclosure. A difference between a touching display panel 500 of the display device 50 in the fifth embodiment and the touching display panel 400 in the fourth embodiment is positions of a thin-film transistor layer TFT5 and a color filter layer CF5. More specifically, the thin-film transistor layer TFT5 is disposed between the touch sensor layer TP5 and the color filter layer CF5, and the touch sensor layer TP5 is disposed between the first glass substrate G51 and the thin-film transistor layer TFT5. Details of other correspondingly components are as those previously described and shall not be further given.

Referring to FIG. 5, in the display panel 500 according to this embodiment of the present disclosure, through integration, the thin-film transistor layer TFT5 and the color filter layer CF5 are disposed at a same side of a liquid crystal layer LC5; the touch sensor layer TP5, the thin-film transistor layer TFT5 and the color filter layer G51 are all joined with a first glass substrate G51 having a hard surface structure G51a. Therefore, a conventional glass substrate used for manufacturing a touch sensor layer structure, a conventional glass substrate used for manufacturing a thin-film transistor structure, and a conventional glass substrate used for manufacturing a color filter structure are not needed.

Further, when the touch sensor layer TP5 and the thin-film transistor layer TFT5 are integrated to a same side of the liquid crystal layer LC5, circuits of the touch sensor layer TP5 and the thin-film transistor layer TFT5 are given with more optimal planning and integration, so that a circuit layout design may be completed through an external circuit board disposed at one side of the touching display panel 500.

In this embodiment, the touching display panel 500 further comprises an insulation layer PL5. The insulation layer PL5 is disposed between the touch sensor layer TP5 and the thin-film transistor layer TFT5, so as to prevent undesired parasitic capacitance between the touch sensor layer TP5 and the thin-film transistor layer TFT5 that may undesirably affect image display effects or touch sensing effects.

Referring to FIG. 5, from outside to inside, the first glass substrate G51, the touch sensor layer TP5, the insulation layer PL5, the thin-film transistor layer TFT5, the color filter layer CF5, the liquid crystal layer LC5 and the second glass substrate G52 are sequentially arranged. Other materials may be arranged between the first glass substrate G51, the touch sensor layer TP5, the insulation layer PL5, the thin-film transistor layer TFT5, the color filter layer CF5, the liquid crystal layer LC5 and the second glass substrate G52 as required.

For example, a first polarization layer PF51 and a second polarization layer PF52 are joined with an internal structure of the touching display panel 500 through a polarizer-film-in-cell technique without any pasting process. For example, the first polarization layer PF51 and the second polarization layer PF52 are respectively disposed at the two sides of the liquid crystal layer LC5. The first polarization layer PF51 may be disposed between the first glass substrate G51 and the touch sensor layer TP5, or between the touch sensor layer TP5 and the thin-film transistor layer TFT5. That is, the first polarization layer PF51 may be disposed between the touch sensor layer TP5 and the insulation layer PL5, or between the insulation layer PL5 and the thin-film transistor layer TFT5. The second polarization layer PF52 may be disposed at an outer side of the second glass substrate G52 relative to the liquid crystal layer LC5. In the embodiment in FIG. 5, the first polarization layer PF51 is disposed between the first glass substrate G51 and the touch sensor layer TP5, and the second polarization layer PF52 is disposed at an outer side of the second glass substrate G52.

Further, a black matrix of the color filter layer CF5 may be integrated to spacing elements PS5 through a black matrix sharing technique to further reduce a thickness of the color filter layer CF5.

With the embodiments above, it is illustrated that a touching display panel of the present disclosure structurally integrates a touch sensor layer, a thin-film transistor layer or a color filter layer to a glass substrate having a hard surface structure, so that the number of substrates is decreased and a thickness of the touching display panel is also reduced to resultantly offer an integrated touching display panel that allows optimal circuit planning and design.

While the disclosure has been described by way of example and in terms of the preferred embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touching display panel, comprising:
a first substrate, comprising a hard surface structure;
a second substrate, disposed opposite to the hard surface structure of the first substrate;
a liquid crystal layer, disposed between the first substrate and the second substrate;
a touch sensor layer, disposed between the first substrate and the liquid crystal layer, and formed on the first substrate; and
a thin-film transistor layer and a color filter layer, both disposed between the first substrate and the second substrate, at least one of the thin-film transistor layer and the color filter layer being formed on the first substrate;
a first polarization layer disposed between the first substrate and the touch sensor layer, between the touch sensor layer and the color filter layer, between the first substrate and the color filter layer, or between the color filter layer and the thin-film transistor layer; and
a second polarization layer disposed between the second substrate and the thin-film transistor layer, at an outer side of the second substrate relative to the liquid crystal layer, or between the second substrate and the color filter layer.

2. The touching display panel according to claim 1, wherein the hard surface structure comprises potassium (K).

3. The touching display panel according to claim 1, wherein the color filter layer is formed on the first substrate and the thin-film transistor layer is formed on the second substrate.

4. The touching display panel according to claim 3, wherein the touch sensor layer is disposed between the first substrate and the color filter layer.

5. The touching display panel according to claim 3, wherein the color filter layer is disposed between the first substrate and the touch sensor layer.

6. The touching display panel according to claim 1, wherein the thin-film transistor layer is formed on the first substrate and the color filter layer is formed on the second substrate.

7. The touching display panel according to claim 6, wherein the touch sensor layer is disposed between the first substrate and the thin-film transistor layer.

8. The touching display panel according to claim 7, further comprising:
an insulation layer, disposed between the touch sensor layer and the thin-film transistor layer.

9. The touching display panel according to claim 1, wherein the thin-film transistor layer and the color filter layer are both formed on the first substrate.

10. The touching display panel according to claim 9, wherein the color filter layer is disposed between the touch sensor layer and the thin-film transistor layer, and the touch sensor layer is disposed between the first substrate and the color filter layer.

11. The touching display panel according to claim 1, wherein the thin-film transistor layer is disposed between the touch sensor layer and the color filter layer, and the touch sensor layer is disposed between the first substrate and the thin-film transistor layer.

12. The touching display panel according to claim 11, further comprising:
an insulation layer, disposed between the touch sensor layer and the thin-film transistor layer.

13. A touching display panel, comprising:
a first substrate, comprising a hard surface structure;
a second substrate, disposed opposite to the hard surface structure of the first substrate;
a liquid crystal layer, disposed between the first substrate and the second substrate;
a touch sensor layer, disposed between the first substrate and the liquid crystal layer, and formed on the first substrate; and
a thin-film transistor layer and a color filter layer, both disposed between the first substrate and the second substrate, at least one of the thin-film transistor layer and the color filter layer being formed on the first substrate;
a first polarization layer, disposed between the first substrate and the touch sensor layer, or between the touch sensor layer and the thin-film transistor layer, or between the thin-film transistor layer and the color filter layer; and
a second polarization layer, disposed at an outer side of the second substrate relative to the liquid crystal layer.

14. A display device, comprising:
a touching display panel according to claim 1; and
a backlight module, for providing a backlight to the touching display panel.

* * * * *